June 28, 1966  L. H. COOK  3,258,486
PROCESS FOR UREA SYNTHESIS
Filed Jan. 23, 1961
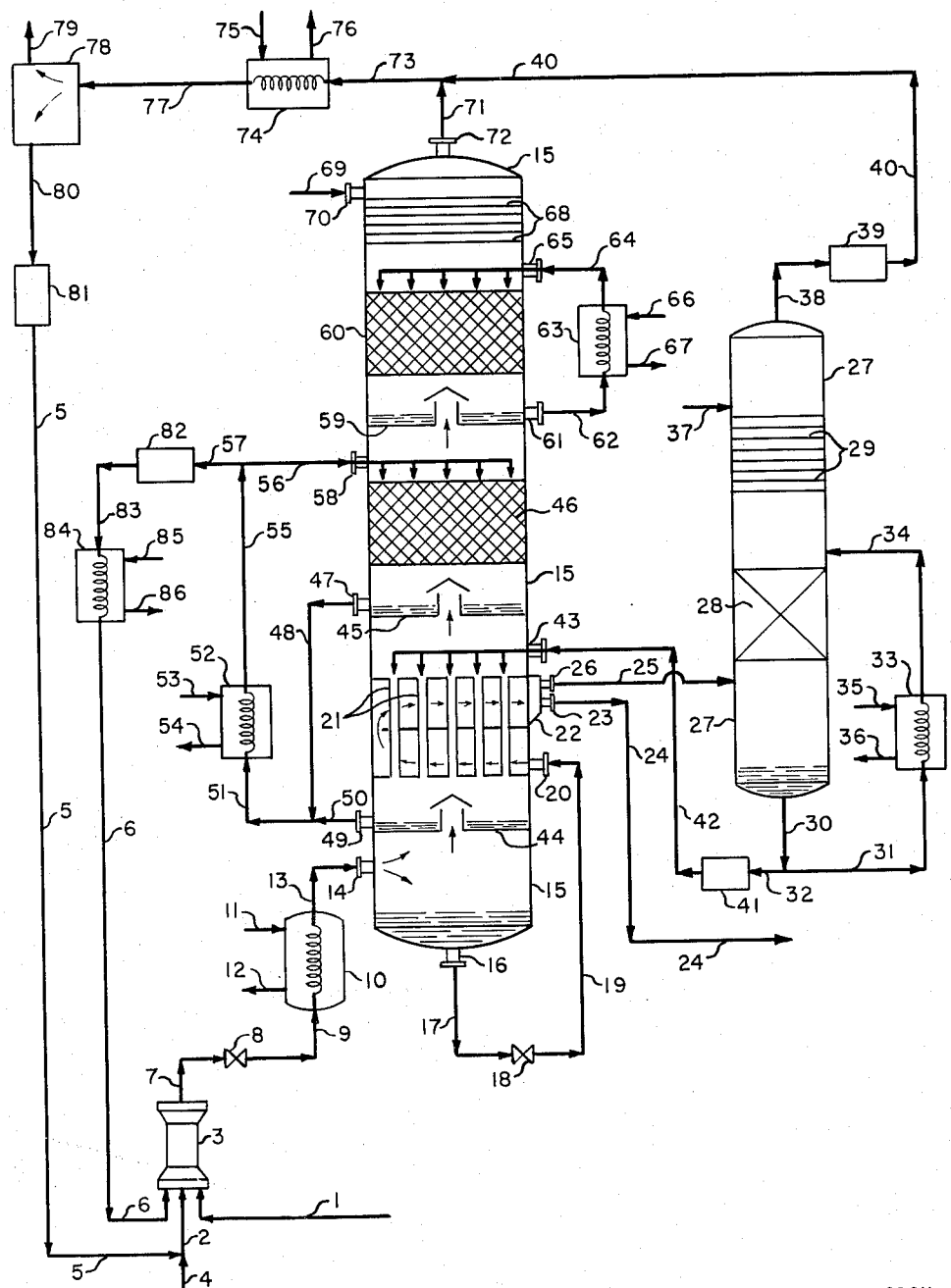
LUCIEN H. COOK
INVENTOR.
BY J. T. Chaboty
AGENT

3,258,486
PROCESS FOR UREA SYNTHESIS
Lucien H. Cook, Port Washington, N.Y., assignor to Chemical Construction Corporation, New York, N.Y., a corporation of Delaware
Filed Jan. 23, 1961, Ser. No. 84,192
4 Claims. (Cl. 260—555)

This invention relates to urea synthesis processes in which the urea reactor effluent is freed of unconverted ammonium carbamate in two stages of decomposition, usually at two successively lower pressure levels. A new process and apparatus combination has been developed for off-gas treatment, whereby complete recycle of unconverted process components is achieved in an improved manner. The process of the present invention represents an improvement of the process generally disclosed in co-pending patent application Serial No. 5,379 filed January 29, 1960, now U.S. Patent No. 3,155,722.

The process of the present invention broadly includes the concept of partial condensation of off-gas to leave a residual ammonia gas stream free of carbon dioxide, together with a concentrated aqueous ammonia-ammonium carbamate solution, both streams being suitable for recycle to urea synthesis. The process of the present invention thus avoids large power costs for gas recompression, as well as other drawbacks of prior complete recycle processes, such as process stream dilution or the use of a carrier medium for ammonium carbamate recycle. However, with regard to the co-pending patent application cited supra, the process of the present invention possesses further distinct advantages. Among these may be mentioned avoidance of overheating and biuret formation, conservation of energy and reduction of power costs by use of gravity mixing, and improved heat transfer between process streams.

Urea is commercially synthesized by the reaction of ammonia with carbon dioxide at elevated pressure and temperature. A recycle stream of aqueous liquid ammonia-ammonium carbamate solution may also be included as an additional input stream. In the basic process, ammonium carbamate is formed as an intermediate compound, which upon loss of water yields urea. The formation of the intermediate compound ammonium carbamate is a rapid reaction under the usual process conditions, and readily goes to completion. However, the dehydration of ammonium carbamate to yield urea and water is a comparatively slow reaction under the usual process conditions, and does not readily go to completion in practice. Thus the effluent from the high-pressure urea synthesis vessel contains a significant proportion of ammonium carbamate as well as urea product. The ammonium carbamate is readily separated from the liquid urea product by heating, which decomposes the ammonium carbamate and generates an off-gas containing ammonia and carbon dioxide. The subsequent processing of this off-gas is relatively difficult, since at lower temperatures and pressures the ammonia and carbon dioxide components readily recombine to form ammonium carbamate as a solid. Various procedures for disposal or recycle of the off-gas have been devised in the past.

One of the earliest commercial processes involved the complete recycle and recompression of the off-gas stream as a gas at elevated temperature. Various mechanical difficulties were encountered due to the condensation of solid carbamate and accelerated corrosion. The basic power requirements were high, due to inherent low efficiency in compressing large volumes of hot gas to high pressure.

Other processes involve recycle of the gases after condensation in a liquid solution or slurry. An aqueous slurry process was one of the earliest commercial procedures, and the use of an inert mineral oil as a slurrying agent for solid carbamate recycle forms the basis of another more recent process. Another process of current interest recovers and absorbs the entire off-gas in a scrubbing solution comprising liquid ammonia, with the possible addition of water as a subsequent scrubbing agent. These procedures result in excessive dilution of the process stream, hence output per unit of autoclave volume is reduced and larger pressure vessels must be provided. When excess water is added, the yield or percent of ammonium carbamate dehydration is also reduced.

Finally, a group of processes is known, which completely separate the components of the mixed off-gas stream, usually by selective absorption. Either ammonia or carbon dioxide is completely absorbed, independent of the other component. Subsequent regeneration of the absorbent solution liberates a pure gas stream which is then readily recycled to the process. The residual component which remains in the off-gas stream after absorption is also independently recycled to the process. High power and thermal requirements due to the necessity of an extra absorption-regeneration cycle are a major objection to this type of process.

Thus a broad range of technical solutions to the problem of off-gas recycle is available. However, it has been unexpectedly found that according to the present invention high yields of urea can be obtained in a full recycle process without disadvantages inherent in other types of process as described above. The process which forms the subject of this invention provides a full utilization of ammonia and carbon dioxide in the synthesis and furthermore provides a conservation of heat and power.

Another significant advantage of the present invention is that water from an external source is not required to dissolve the recycling carbamate being returned to the synthesis step. An additional advantage of the present invention is that off-gas pressure levels are conserved, and consequently power requirements for gas recompression are sharply reduced.

There are several important advantages to the process of the present invention, as contrasted to the process described in the copending patent application cited supra, now issued as U.S. Patent No. 3,155,722.

First, biuret formation is sharply reduced, due to the maintenance of a relatively smooth temperature profile and consequent avoidance of overheating in the second stage of carbamate decomposition.

Second, energy is conserved and power requirements reduced since mixing is now accomplished with the aid of gravity, in a vertical-tube heat exchanger.

Third, heat exchange surface requirement is sharply reduced due to improved heat transfer coefficients which are obtained by means of liquid-wetted wall surfaces.

It is an object of this invention to provide an improved process of urea synthesis.

Another object is to produce urea in a complete recycle process which does not produce a net off-gas.

A further object is to process and recycle off-gas produced by ammonium carbamate decomposition in an improved and more efficient manner.

An additional object is to provide a urea synthesis process which permits recycle of unconverted material without addition of water from an external source into the process stream.

Still another object is to recycle off-gas produced from two-stage ammonium carbamate decomposition at two different pressure levels in a more efficient manner with reduced gas recompression power requirements.

Another object is to provide improved apparatus for the treatment of off-gas produced in urea synthesis processes.

An object is to produce urea with minimum biuret content.

Still a further object is to provide more economical and improved mixing and concomitant heat transfer, in the treatment of process streams obtained in urea synthesis.

These and other objects of the present invention will become evident from the description which follows.

The present invention is primarily directed to urea synthesis processes in which two-stage decomposition of ammonium carbamate is effected at two pressure levels succeedingly lower than synthesis pressure. Since this is the conventional and most economical procedure, the process of the present invention is widely applicable to existing installations as well as new facilities.

In the process according to this invention, the hot second stage off-gas stream derived at low pressure and containing ammonia, carbon dioxide and water vapor, is contacted with cool recirculating aqueous ammonium carbamate solution containing excess ammonia. This contact is accomplished by scrubbing the gas stream in the lower packed section of a condenser-stripper vessel. The scrubbing step condenses the major portion of water vapor from the gas stream together with some ammonia, however, the most important effect of this step is that it strips most of the carbon dioxide content from the gas stream, thus leaving an ammonia-rich gas stream. This residual ammonia-rich gas stream is further scrubbed in additional packed and bubble-cap sections, leaving an ammonia exit gas free of carbon dioxide. This ammonia gas stream is separately compressed, condensed and recycled to the process in the ammonia feed section.

The initial scrubbing step cools the gas stream as well as condensing and stripping water, ammonia, and carbon dioxide. A major portion of the heated scrubbing liquid is externally cooled and recycled. The balance of this liquid stream is drawn off as an ammonia-ammonium carbamate solution, which is then raised to a high pressure and utilized to contact and partially absorb the high pressure off-gas derived from the first stage of ammonium carbamate decomposition. This contact between the first stage off-gas and the liquid solution results in the generation of heat, and takes place while in heat exchange with the urea stream in the second stage of carbamate decomposition. Thus the heat which is generated serves to provide the necessary heating for final carbamate decomposition.

A most important aspect of the present invention concerns the apparatus element employed to accomplish the gas-liquid contact and partial absorption while simultaneously providing heat exchange for second stage carbamate decomposition. A new apparatus configuration is provided for this purpose, namely, a vertical-tube heat exchanger. This unit also provides a new and improved concept of process operation, since the gas-liquid contact and partial absorption is accomplished by running the liquid down inside the tubes, primarily on the inner tube surfaces, while passing the gas upwards through the tubes. The liquid process stream in which carbamate decomposition takes place is passed upwards in the shell side of the unit, with upper removal of off-gas and product urea solution. This off-gas is passed to a condenser-stripper vessel as the hot second stage off-gas stream described supra.

The vertical-tube heat exchanger element is disposed near the bottom of a unitary apparatus combination which accomplishes complete treatment of the first stage off-gas to yield pure ammonia and concentrated aqueous ammonia-ammonium carbamate process streams for process recycle. The residual unabsorbed first stage off-gas rises through the heat exchanger tubes and is then scrubbed with a cool recirculating aqueous ammonia-ammonium carbamate solution in a first packed section disposed above the heat exchanger element. This scrubbing step condenses more liquid from the gas stream, and in addition strips most of the carbon dioxide from the gas stream, together with some ammonia and water vapor. The residual ammonia-rich gas stream is further scrubbed in additional packed and bubble-cap sections, leaving a high-pressure top exit gas consisting of ammonia which is substantially free of carbon dioxide. This ammonia gas stream is readily condensed to liquid ammonia using plant cooling water without compression, and is then recycled to the process in the ammonia feed section.

The vertical-tube heat exchanger apparatus element provides several important process advantages. The tube-side reaction is ordinarily very rapid, and may generate excessive temperature rises under some conditions. It has been found, for example, that the process and apparatus described in co-pending patent application Serial No. 37,641 filed June 21, 1960, now U.S. Patent No. 3,147,304, which relates to improvements in this processing step, may cause excessive biuret formation under some process conditions. In the present invention, the tube-size reaction is moderated and excessive temperature rises are prevented because reaction takes place over practically the entire length of the tubes. Thus excessive heating of the shell-side product stream cannot take place, and biuret formation is avoided. Further, energy is conserved and pumping power costs eliminated in the tube-side gas-liquid mixing, since the mixing is aided by gravity in that the liquid flows down the tubes while the gas rises upward. Heat transfer is also more rapid, and less transfer surface is required, because the liquid films passing over the heat transfer surfaces are essentially free of included gas phase. In application Serial No. 37,641 cited supra, the gas-liquid mixing takes place at the bottom of the shell side, with the mixed process stream thereafter rising through the apparatus. Rapid reaction and high heat liberation takes place, and due to the included gas phase the overall heat transfer rate is low.

The process of the present invention additionally possesses the various advantages of the prior process described in application Serial No. 5,379 cited supra. Thus, the first stage off-gas is a relatively large gas stream. The high pressure treatment in the tubes of the vertical-tube heat exchanger, followed by cooling and scrubbing in the packed sections and cooling and refluxing, produces pure ammonia off-gas at high pressure. Subsequent condensation to liquid and compression to process recycle are thus accomplished in a highly economical manner. A portion of the scrubbing liquid employed in each packed section is drawn off as a concentrated ammonia-ammonium carbamate solution and subsequently compressed and recycled to urea synthesis. Thus readily compressible streams are recycled, and power requirements are sharply reduced since gas recompression is limited to the low pressure ammonia gas derived from the second stage off-gas. The only streams leaving the system are the product urea solution and the inerts discharged after ammonia condensation. Excessive dilution of process streams is avoided, since no additional external components are added to the process.

A detailed description of the operation of the process and apparatus of the present invention will now be given. Referring to the figure, incoming carbon dioxide feed stream 1 and ammonia stream 2 are passed into high pressure urea synthesis reactor 3, with the total ammonia feed stream 2 consisting of incoming stream 4 combined with recycle ammonia stream 5. Recycle stream 6, consisting of a concentrated aqueous ammonia-ammonium carbamate solution, is also passed into reactor 3. Within reactor 3, ammonia and carbon dioxide combine to form ammonium carbamate, and a portion of the ammonium carbamate dehydrates to yield urea. The pressure and temperature ranges for urea synthesis within reactor 3 are well known, thus the pressure inside reactor 3 will be about 2000 to 6000 p.s.i.g. while the temperature will be in a range between about 320° to 430° F. Reactor 3 may be suitably disposed to provide either horizontal or vertical flow of reactants, in accordance with known urea synthesis reactor design. The overall molar feed ratio of reactants is also a matter of selection and may vary from slightly above the stoichiometric 2 to 1 molar ratio of ammonia to carbon dioxide up to about 5 to 1, or even higher. In general, ratios higher than about 5 to 1 are considered not economical from a practical point of view, since it becomes necessary to provide a special vessel for the preliminary separation of excess ammonia from the reactor effluent, prior to ammonium carbamate decomposition. Of course it should be understood that the process of the present invention is also readily applicable to such processes, as will appear from the following section of the process description.

The process stream now leaves reactor 3 via line 7. This stream will contain about 40% to 60% urea, with the balance consisting mainly of ammonium carbamate, ammonia and water. Specific proportions of these components will be a function of the aforementioned operating variables. Stream 7 is first passed through pressure reducing valve 8 whereby process stream pressure is reduced to a level of between about 200 p.s.i.g. to 400 p.s.i.g., prior to the first stage of ammonium carbamate decomposition. The specific pressure selected will depend on engineering considerations in a particular case. The stream now passes via line 9 to vessel 10, which is the first stage of a two-stage ammonium carbamate decomposition system. Vessel 10 is a steam-heated shell and tube heat exchanger, with steam entering the shell via 11 and condensate leaving via 12. The process stream 9 passes through the tubes of vessel 10, and due to the application of heat at the reduced pressure a major portion of the ammonium carbamate present decomposes into ammonia and carbon dioxide. The temperature of the process stream inside vessel 10 will depend on the particular operating pressure. Thus at 400 p.s.i.g., stream temperature will be from 275° F. to 300° F., while at 200 p.s.i.g. the stream temperature will be maintained at from about 240° F. to 265° F. Lower temperature is feasible at the lower pressure since ammonium carbamate is more readily decomposed at a lower pressure. The resulting process stream leaves via 13 and passes via inlet 14 into high pressure off-gas treatment vessel 15.

On passing into vessel 15, stream 13 separates into off-gas and residual liquid components. The off-gas stream rises through vessel 15 and is finally purified to pure ammonia. The residual liquid component, containing product urea, is removed from the bottom of vessel 15 via outlet 16 as stream 17. Liquid stream 17 is then passed through pressure reducing valve 18 whereby process stream pressure is reduced to a level of between about 5 p.s.i.g. to 50 p.s.i.g. The resulting stream 19 is now passed at the reduced pressure through inlet 20 into the shell side of the vertical-tube heat exchanger section of vessel 15 at a temperature between about 170° F. to 250° F.

Within the shell side of the heat exchanger section, stream 19 is further heated by vertical tubes 21 whereby the final decomposition of residual ammonium carbamate present in stream 19 takes place. As previously discussed in connection with the first stage of decomposition, optimum operation temperature is primarily a function of pressure. However, this temperature depends also on the compositions of the gas and liquid streams within tubes 21 and thus must be empirically determined for a particular set of conditions.

The process stream containing product urea now passes from the shell side to separator 22, in which the off-gas and liquid phases are separated. The liquid phase, consisting of product urea solution containing minute quantities of ammonia and carbon dioxide, is removed from separator 22 via outlet 23, and finally passed via 24 to known urea finishing operations such as prilling, prior to final shipment as finished urea product.

Returning now to separator 22, a final off-gas stream 25 is removed from separator 22 via outlet 26. Stream 25, containing ammonia, carbon dioxide and water, is recovered at a pressure between 5 p.s.i.g. and 50 p.s.i.g. and temperature between 170° F. to 250° F., closely corresponding to shell-side conditions in the previously described heat exchanger section. Stream 25 consists primarily of ammonia, carbon dioxide and water vapor in proportions dependent upon operating variables, usually stream 25 will contain about 40% ammonia, 25% carbon dioxide and 30% water vapor.

Gas stream 25 is passed into condenser-stripper vessel 27 below packed section 28. An additional packed section, not shown, may also be included in vessel 27 for accurate temperature control. A bubble cap plates section 29 is provided in the upper section of vessel 27, for final purification of the rising gas stream. The entering gas stream 25 passes upwards through packed section 28 and bubble cap plates section 29. In each section the gas is scrubbed with an aqueous ammonia-ammonium carbamate solution, whereby carbon dioxide is removed from the gas. In section 28 the scrubbing also cools the gas, preferably to a temperature between about 125° F. to 140° F. This cooling serves to remove most of the carbon dioxide from the gas stream, as well as condensing water vapor and some ammonia. The lower the temperature to which the gas stream is cooled, the more water vapor and carbon dioxide will be removed. Thus above 140° F. an insufficient amount of carbon dioxide is removed from the gas stream, while below 125° F. the scrubbing solution may deposit solid carbamate.

The warmed aqueous solution collected at the bottom of vessel 27 at a temperature between about 130° F. to 145° F. consists essentially of a concentrated ammonium carbamate solution in equilibrium with excess ammonia, and contains about 32% ammonia, 32% carbon dioxide and 36% water. This solution is removed via line 30 and partially recycled via 31, with the balance passing to other parts of the process via 32. Recycle stream 31 is first cooled in cooler 33 to a temperature between about 125° F. to 140° F., and is then recycled via 34 to vessel 27 above packed section 28. As previously described, the primary function of stream 34 is to cool and scrub the gas stream in packed section 28, thereby simultaneously condensing and removing carbon dioxide, together with water vapor and some ammonia. Recycle cooler 33 is cooled by cooling water admitted via 35 and removed via 36.

The residual gas stream now passes upwards from packed section 28 to bubble cap plates section 29. At this point the gas stream is at a temperature of about 125° F. to 140° F. and contains about 0.3% to 0.5% carbon dioxide, with the balance primarily consisting of ammonia plus some water vapor and inerts. The gas stream passes upwards through bubble cap plates 29, and is further cooled and refluxed. A temperature gradient is maintained in plates section 29, with the top plate being cooled to a liquid phase temperature of about 50° F. or less, either by cooling coils or by flashing in a slight amount of ammonia via 37. Thus the liquid phase on the top tray is a strong cold ammonia solution containing about 55% ammonia with only a very minor carbon dioxide content, while the liquid phase on the bottom tray is warm and lower in free amonnia, but contains about 10% to 20% ammonium carbamate.

The gas stream is thus essentially freed of carbon dioxide content in section 29, and leaves unit 27 via 38 at a temperature between about 50° F. to 75° F. as ammonia gas with less than 100 p.p.m. carbon dioxide, together with about 1% by weight of water vapor and inert gases. The maximum allowable gas temperature at the top of section 29 is primarily a function of pressure.

Thus if unit 27 is operated at 15 p.s.i.g., the outlet gas temperature must be maintained below 80° F. to insure complete removal of carbon dioxide. At 50 p.s.i.g., the maximum allowable temperature is 85° F. In any case, the gas must be cooled to below 100° F., with lower temperature being required at lower pressures.

Gas stream 38 is recycled to urea synthesis, and is preferably first compressed to an intermediate pressure between about 200 p.s.i.g. to 400 p.s.i.g. in gas compressor 39. The partially compressed ammonia gas stream 40 then joins another recycle stream of substantially pure ammonia, which is produced from first stage carbamate decomposition off-gas in a manner to be described infra.

Returning now to the bottom of low pressure condenser-stripper vessel 27, liquid solution stream 32, described supra, is drawn off and compressed to an elevated pressure between about 200 p.si.g. to 400 p.si.g. by pump 41. The resulting high pressure liquid stream 42 is admitted via inlet 43 into vessel 15, and is thereafter dispersed into vertical tubes 21, preferably so as to wet and pass downwards on the inner surfaces of tubes 21 as a liquid film. The downflowing liquid reacts with and partially absorbs the first stage off-gas which is passing upwards inside tubes 21. This off-gas stream is derived from stream 13, admitted via inlet 14. The gaseous portion of stream 13 rises inside vessel 15, passing upwards through the central passage of gas-liquid partition 44. Partition 44 serves to recover downflowing liquid solution from tubes 21, while allowing upward gas flow.

The reaction inside tubes 21 between the downflowing liquid stream 42 and the rising first stage off-gas serves to generate heat, which maintains a temperature level between about 230° F. to 320° F. inside the tubes. As described supra, a final decomposition of ammonium carbamate in stream 19 is thereby effected.

The residual gas phase now passes upwards from tubes 21, through gas-liquid partition 45, and is cooled and scrubbed in packed section 46. Section 46 has a function and mode of operation similar to section 28 described supra, except that the operating pressure is about 200 p.s.i.g. to 400 p.s.i.g. and the rising gas does not have original off-gas proportions due to modification of composition inside tubes 21.

The scrubbing liquor is recovered from section 46 on partition 45, and removed via outlet 47 as stream 48. Similarly, the absorbent liquor is recovered below tubes 21 on partition 44, and removed via outlet 49 as stream 50. Streams 48 and 50 are now preferably combined to form stream 51, which is cooled in heat exchanger 52 from an inlet temperature between about 250° F. to 350° F. to an exit temperature between about 200° F. to 212° F. Cooling water is admitted to exchanger 52 via 53 and removed via 54. The cooled liquor stream 55 is now split into scrub recycle stream 56 and synthesis recycle stream 57. Scrub recycle stream 56 is passed into vessel 15 via inlet 58 and dispersed over packed section 46, to provide gas cooling and scrubbing as described supra. The combination of liquid streams 48 and 50 to form stream 58 represents a preferred embodiment of the present invention. Depending on relative stream sizes and compositions, in some instances either stream 48 or 50 may bypass heat exchanger 52 and instead may form part of streams 55 or 57.

The rising gas stream inside vessel 15 now passes upwards from packed section 46 and through gas-liquid partition 59. At this point the gas stream consists mostly of ammonia with about 5% carbon dioxide, and is at a temperature between about 200° F. to 212° F. The gas stream is now preferably further cooled and scrubbed in packed section 60, which has a function and mode of operation similar to section 46 described supra. The scrubbing solution in section 60 is a dilute ammonium carbamate solution containing excess ammonia. After scrubbing, the solution is withdrawn via outlet 61 and line 62 at a temperature below 200° F., cooled in cooler 63 to a temperature between about 140° F. to 150° F., and recycled via 64 and inlet 65, and again dispersed over packed section 60. A small portion of the recycling solution is diverted to the lower section of vessel 15 by means not shown, to compensate for liquid condensed from the gas stream due to cooling in section 60. Exchanger 63 is cooled by cooling water admitted via 66 and withdrawn via 67.

Section 60 differs from section 46 in having a lower temperature level and a weaker scrubbing solution. The carbon dioxide content of the gas stream is lowered from about 5% to about 0.3% to 0.5% by the scrubbing step in section 60. Depending on operating conditions and compositions, in some instances section 60 may be omitted and its purification function performed by section 46 in conjunction with the bubble cap plates section 68 to be described infra. This modification is not possible in some instances, due to the danger of precipitation of solid ammonium carbamate. Thus it is usually preferable to provide two packed sections 60 and 46, thereby accomplishing more gradual cooling.

The gas stream now passes upwards through bubble cap plates section 68. Section 68 has a function and mode of operation similar to section 29 described supra. Thus a cooling and refluxing of the gas stream is accomplished on plates 68, whereby the final carbon dioxide content is removed from the gas phase. Liquid ammonia stream 69 may be admitted via inlet 70 to one or several plates to provide the required cooling effect so as to produce a final gas phase temperature above the top plate between about 110° F. to 120° F. In some instances, particularly at start-up of the process, a small amount of liquid water may also be admitted via inlet 70 to prevent any possible deposition of solid ammonium carbamate.

A final recycle gas stream 71, consisting essentially of pure ammonia, is removed from vessel 15 at 200 p.s.i.g. to 400 p.s.i.g. via outlet 72, and combined with recycle ammonia stream 40 to yield a total recycle ammonia stream 73. Stream 73 is passed into cooler-condenser 74, which is cooled by cooling water admitted via 75 and removed via 76. Essentially all of the ammonia is condensed to liquid which passes via 77 to separator 78, from which a purge gas stream 79 containing inerts is removed. Stream 79 is refrigerated for ammonia recovery, not shown, and is discharged to a stack. The liquid ammonia recycle stream is removed from separator 78 as liquid recycle stream 80, compressed to urea synthesis pressure in compressor 81, and then passed via 5 and 2 to further urea synthesis in autoclave 3.

Returning to off-gas treatment vessel 15, a portion of stream 55 is diverted via 57 while the balance is dispersed over packed section 46. Stream 57, consisting of a concentrated ammonia-ammonium carbamate solution, is compressed to urea synthesis pressure in compressor 82, then passed via 83 to heater 84 in which the stream is heated to urea synthesis temperature. Heater 84 is preferably heated by steam admitted via 85 with condensate removal via 86. In some instances, heater 84 and its corresponding function may be omitted. This would particularly be the case at lower ratios of excess ammonia, since in such instances sufficient heat is autogenously developed in the urea synthesis autoclave. The ammonia-ammonium carbamate liquid solution is now passed via 6 to further urea synthesis in autoclave 3.

Numerous variations within the scope of the present invention will occur to those skilled in the art. Thus, for example, in some instances it might be advisable or necessary to avoid or supplement the usage of stream 42 as a reactant with the rising off-gas inside tubes 21. This process sequence might be modified or eliminated for a variety of reasons, such as if insufficient heat was developed for complete carbamate decomposition. Stream 42 could thus be supplemented or replaced by a more dilute aqueous ammonium carbamate solution or aqueous ammonia solution, or in some cases even water could be used instead of stream 42. Under such circumstances, stream 42 would be recycled to the process as a component of combined stream 51.

*Example*

An industrial urea synthesis facility utilizing the teaching of the present invention will now be described. The urea process was operated with an overall 3.5:1 ratio of ammonia to carbon dioxide in the reactor feed. Reactor operating pressure was 3200 p.s.i.g. and temperature about 365° F. A 53% yield of urea was obtained in the reactor effluent, based on carbon dioxide feed. The first stage of carbamate decomposition achieved a 68% decomposition of unconverted ammonium carbamate at a pressure of 235 p.s.i.g. and temperature of 266° F. The resulting first stage off-gas was liberated at the lower end of the high-pressure gas treatment apparatus at a rate of 6300 pounds per hour, and contained 30% carbon dioxide, 61% ammonia and 8% water vapor by weight, plus inerts. This gas stream was contacted in the tubes of the vertical-tube heat exchanger section with 3300 pounds per hour of liquid recycle solution from the low pressure condenser stripper bottoms which contained 32% ammonia, 32% carbon dioxide and 36% water. An average tube-side temperature of 300° F. was thereby maintained at a pressure of 230 p.s.i.g., which provided heat for final low-pressure carbamate decomposition. The process stream was thus treated for final carbamate decomposition at a pressure of 15 p.s.i.g. and temperature of 200° F.

A final off-gas containing 41% ammonia, 27% carbon dioxide and 31% water vapor was recovered from the gas-liquid separator at the shell side of the vertical tube heat exchanger, at a rate of 3600 pounds per hour. This gas was passed to the low pressure condenser-stripper at 15 p.s.i.g. The gas stream was cooled and partially condensed in this unit, with a net yield of 520 pounds per hour of pure ammonia gas being recovered. The liquid bottoms were removed at 130° F., with 3300 pounds per hour of the stream being drawn off, pressurized to 235 p.s.i.g. and sent to contact first stage off-gas as previously described. The balance of the bottoms was cooled to 125° F. and recycled above the packing section in the condenser-stripper. The gas phase above this packing section contained 0.5% carbon dioxide, and consisted essentially of ammonia plus a small amount of water vapor and inerts. This gas stream was refluxed and essentially freed of carbon dioxide in the final bubble-cap section, which contained 7 plates. The bottom plate had a liquid phase temperature of 107° F. and carbon dioxide content of 11.75%, while the top plate had a liquid phase temperature of 55° F. and carbon dioxide content of 0.02%. About 40 pounds per hour of liquid ammonia was admitted below the top plate to maintain this temperature profile. The final pure ammonia gas stream totalled 560 pounds per hour, and contained only 25 p.p.m. of carbon dioxide and 0.5% water vapor. The water was readily removed during the subsequent gas compression.

Returning now to the high pressure gas purification unit, the rising gas stream passed up from the tubes of the vertical-tube heat exchanger at a temperature of 250° F. The gas stream was cooled and scrubbed with concentrated ammonium carbamate solution in the first packed section. The residual gas amounted to 1500 pounds per hour and was at a temperature of 210° F. This gas stream, containing 3% carbon dioxide, 3% water vapor and 6% inerts with the balance consisting of ammonia, was further scrubbed in the upper packed section. Here a relatively dilute scrub solution containing about 25% water, 24% carbon dioxide and 50% ammonia was used, with heated solution withdrawn at 145° F. and cooled to 140° F. prior to recycle. The resulting gas phase above the upper packed section contained 0.5% carbon dioxide and 1.5% water vapor, balance ammonia plus inerts.

This gas stream was refluxed and completely freed of carbon dioxide in the top bubble cap plates section of the vessel, with the bottom plate liquid phase at 135° F. and the top plate liquid phase maintained at 115° F. by injection of 100 pounds per hour of liquid ammonia below this plate. The final off-gas consisted of 1350 pounds per hour of essentially pure ammonia gas at 235 p.s.i.g. and 115° F., and was passed directly to an ammonia condenser where the ammonia was liquefied and 0.5% water vapor was removed. Carbon dioxide content was less than 80 p.p.m.

This invention is not limited to the specific combination of process steps recited in this example, since modifications of operation variables or processing steps within the scope of the present invention will readily occur to those skilled in the art, in addition to those variations previously mentioned.

I claim:

1. In a urea synthesis process in which ammonia, carbon dioxide and recycle ammonium carbamate solution are reacted at elevated pressure to produce urea, the resulting process stream is heated in a first stage at intermediate reduced pressure to decompose a portion of contained ammonium carbamate and generate a first off-gas stream containing ammonia, carbon dioxide and water vapor, the pressure of the residual liquid process stream is lowered to a final reduced pressure, said residual liquid process stream is heated in a second stage at final reduced pressure to decompose the balance of contained ammonium carbamate and generate a second off-gas stream containing ammonia, carbon dioxide and water vapor, thereby producing a final residual liquid stream comprising product aqueous urea solution, the improvement which comprises (a) passing said first off-gas stream upwardly through a vertical heat exchange zone, (b) passing an aqueous liquid absorbent solution downwardly through said vertical heat exchange zone as a thin liquid film and in extended surface contact with said first off-gas stream, whereby said first off-gas stream is partially absorbed in said aqueous absorbent solution and heat is generated, and (c) passing said residual liquid process stream containing ammonium carbamate at final reduced pressure in heat exchange relation with said first off-gas stream and aqueous liquid absorbent solution in said vertical heat exchange zone, whereby heat is absorbed by said residual process stream and the balance of contained ammonium carbamate is decomposed to generate said second off-gas stream.

2. Process of claim 1, in which said aqueous liquid absorbent solution comprises aqueous ammonium carbamate solution produced by partial condensation of said second off-gas stream.

3. In a complete recycle urea synthesis process in which ammonia, carbon dioxide and recycle ammonium carbamate solution are reacted at elevated pressure to produce urea, the resulting process stream is heated in a first stage at intermediate reduced pressure to decompose a portion of contained ammonium carbamate and generate a first off-gas containing ammonia, carbon dioxide and water vapor, said first off-gas is separated from residual liquid process stream and scrubbed with a first ammonium carbamate solution whereby a portion of said first off-gas is condensed and absorbed into said first solution, a portion of said first ammonium carbamate solution is recycled to urea synthesis as said recycle ammonium carbamate solution, the remaining unabsorbed first off-gas is further cooled and refluxed whereby a final first off-gas stream is produced comprising intermediate pressure ammonia gas substantially free of carbon dioxide, the pressure of said residual liquid process stream is lowered to a final reduced pressure, said residual liquid process stream is heated in a second stage at final reduced pressure to decompose the balance of contained ammonium carbamate and generate a second off-gas stream containing ammonia, carbon dioxide and water vapor, said second off-gas stream is separated from final residual liquid stream comprising product aqueous urea solution, said second off-gas stream is scrubbed with a second ammonium carbamate solution whereby a portion of said second off-gas is condensed and absorbed into said second solution, the remaining unabsorbed second off-gas is further cooled and refluxed whereby a final second off-gas stream is produced comprising low pressure ammonia gas, and said intermediate pressure and low pressure ammonia gas streams are recycled to urea synthesis, the improvement which comprises (a) passing said first off-gas stream upwardly through a vertical heat exchange zone prior to said scrubbing with first ammonium carbamate solution, (b) withdrawing a portion of said second ammonium carbamate solution derived from said scrubbing of second off-gas and pressurizing said withdrawn second ammonium carbamate solution to said intermediate pressure level, (c) passing said pressurized second ammonium carbamate solution from step (b) downwardly through said vertical heat exchange zone as a thin liquid film and in extended surface contact with said first off-gas stream, whereby said first off-gas stream is partially absorbed in said second ammonium carbamate solution and heat is generated, (d) combining the ammonium carbamate solution derived from step (c) with said first ammonium carbamate solution, and (e) passing said residual liquid process stream at final reduced pressure and containing undecomposed ammonium carbamate in heat exchange relation with said first off-gas stream and second ammonium carbamate solution in said vertical heat exchange zone, whereby heat is absorbed by said residual process stream and the balance of contained ammonium carbamate is decomposed to generate said second off-gas stream.

4. In a complete recycle urea synthesis process in which ammonia, carbon dioxide and recycle ammonium carbamate solution are reacted in an overall molar ratio of ammonia to carbon dioxide between 2:1 to about 5:1 at a pressure between 2000 p.s.i.g. to 6000 p.s.i.g. and temperature between 320° F. to 430° F. whereby between about 40% to 60% conversion of ammonium carbamate to urea takes place, the resulting process stream is heated to a temperature between about 240° to 300° F. in a first stage at a reduced pressure between about 200 p.s.i.g. to 400 p.s.i.g. to decompose a major portion of contained ammonium carbamate and generate a first off-gas containing ammonia, carbon dioxide and water vapor, said first off-gas is separated from residual liquid process stream and scrubbed with a first ammonium carbamate solution at a temperature in the range of 140° F. to 212° F., whereby a portion of said first off-gas is condensed and absorbed into said first solution, a portion of said first ammonium carbamate solution is compressed to urea synthesis pressure between 2000 p.s.i.g. and 6000 p.s.i.g. and recycled to urea synthesis as said recycle ammonium carbamate solution, the remaining unabsorbed first off-gas is further cooled and refluxed to a final temperature below 120° F. whereby a final first off-gas stream is produced comprising ammonia gas at a pressure in the range of 200 p.s.i.g. to 400 p.s.i.g. and substantially free of carbon dioxide, the pressure of said residual liquid process stream is lowered to a final reduced pressure between about 5 p.s.i.g. to 50 p.s.i.g., said residual liquid process stream is heated to a temperature between about 170° F. to 250° F. in a second stage to decompose the balance of contained ammonium carbamate and generate a second off-gas stream containing ammonia, carbon dioxide and water vapor, said second off-gas stream is separated from final residual liquid stream comprising product aqueous urea solution, said second off-gas stream is scrubbed with a second ammonium carbamate solution at a temperature in the range of 125° F. to 145° F., whereby a portion of said second off-gas is condensed and absorbed into said second solution, the remaining unabsorbed second off-gas is further cooled and refluxed to a final temperature below 100° F., whereby a final second off-gas stream is produced comprising ammonia gas at a pressure between about 5 p.s.i.g. to 50 p.s.i.g., and said final first and second off-gas streams comprising ammonia gas are recycled to urea synthesis, the improvement which comprises (a) passing said first off-gas stream upwardly through a vertical heat exchange zone prior to said scrubbing with first ammonium carbamate solution, (b) withdrawing a portion of said second ammonium carbamate solution derived from said scrubbing of second off-gas and pressurizing said withdrawn second ammonium carbamate solution to a pressure between about 200 p.s.i.g. to 400 p.s.i.g., (c) passing said pressurized second ammonium carbamate solution from step (b) downwardly through said vertical heat exchange zone as a thin liquid film and in extended surface contact with said first off-gas stream, whereby said first off-gas stream is partially absorbed in said second ammonium carbamate solution at a temperature between about 230° F. to 320° F. and heat is generated, (d) combining the ammonium carbamate solution derived from step (c) with said first ammonium carbamate solution, and (e) passing said residual liquid process stream at a pressure in the range of 5 p.s.i.g. to 50 p.s.i.g. and containing undecomposed ammonium carbamate in heat exchange relation with said first off-gas stream and second ammonium carbamate solution in said vertical heat exchange zone, whereby heat is absorbed by said residual process stream and the balance of contained ammonium carbamate is decomposed to generate said second off-gas.

References Cited by the Examiner
UNITED STATES PATENTS

| | | | |
|---|---|---|---|
| 2,894,878 | 7/1959 | Cook | 260—555 |
| 2,913,493 | 11/1959 | Sze et al. | 260—555 |
| 2,946,726 | 7/1960 | Markels | 202—158 |
| 2,954,330 | 7/1960 | Schmieding | 202—158 |
| 3,005,849 | 10/1961 | Otsuka | 260—555 |
| 3,091,637 | 5/1963 | Cook et al. | 260—555 |
| 3,137,725 | 6/1964 | Cook et al. | 260—555 |

HENRY R. JILES, *Acting Primary Examiner.*

IRVING MARCUS, *Examiner.*